US008001267B2

(12) United States Patent
Cors et al.

(10) Patent No.: US 8,001,267 B2
(45) Date of Patent: Aug. 16, 2011

(54) APPARATUS, SYSTEM, AND METHOD FOR AUTOMATICALLY VERIFYING ACCESS TO A MULTIPATHED TARGET AT BOOT TIME

(75) Inventors: Josep Cors, Rochester, MN (US); Scott Neil Dunham, Raleigh, NC (US); Theodore Brian Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1084 days.

(21) Appl. No.: 11/300,999

(22) Filed: Dec. 15, 2005

(65) Prior Publication Data
US 2007/0143583 A1 Jun. 21, 2007

(51) Int. Cl.
*G06F 15/16* (2006.01)
(52) U.S. Cl. ...................................................... 709/238
(58) Field of Classification Search .................. 709/204, 709/238
See application file for complete search history.

(56) References Cited

U.S. PATENT DOCUMENTS

| 5,349,643 | A | 9/1994 | Cox et al. |
| 5,884,024 | A | 3/1999 | Lim et al. |
| 6,212,563 | B1 | 4/2001 | Beser |
| 6,697,868 | B2 | 2/2004 | Craft et al. |
| 6,728,875 | B1 | 4/2004 | Aguilar |
| 6,857,069 | B1 | 2/2005 | Rissmeyer |
| 6,922,722 | B1 * | 7/2005 | Mann et al. ................... 709/220 |
| 7,127,602 | B1 | 10/2006 | Bakke et al. |
| 7,337,219 | B1 | 2/2008 | Meenan et al. |
| 7,363,356 | B1 | 4/2008 | Rissmeyer et al. |
| 7,403,987 | B1 * | 7/2008 | Marinelli et al. ............. 709/223 |
| 2002/0120706 | A1 | 8/2002 | Murphy |
| 2002/0161848 | A1 | 10/2002 | Willman et al. |
| 2002/0199205 | A1 | 12/2002 | Sonawane et al. |
| 2003/0005276 | A1 * | 1/2003 | French et al. ................... 713/2 |
| 2003/0084209 | A1 | 5/2003 | Chadalapaka |
| 2003/0093541 | A1 | 5/2003 | Lolayekar et al. |
| 2003/0131182 | A1 | 7/2003 | Kumar et al. ................... 711/5 |

(Continued)

FOREIGN PATENT DOCUMENTS

JP 2005244988 9/2005

(Continued)

OTHER PUBLICATIONS

Ed Park, Dual-Boot Linux and Windows 2000/Windows XP with GRUB Howto, Mar. 29, 2003, Whole Document.*

(Continued)

*Primary Examiner* — Wing F Chan
*Assistant Examiner* — Andrew Woo
(74) *Attorney, Agent, or Firm* — Kunzler Needham Massey & Thorpe

(57) ABSTRACT

An apparatus, system, and method are disclosed for automatically verifying access to a multipathed target at boot time. The apparatus is provided with a logic unit containing a plurality of modules configured to functionally execute the necessary steps of identifying a plurality of paths to a target device, automatically selecting one of the plurality of paths to the target device, and verifying access on at least one path to the target device. Beneficially, the disclosed embodiments of the apparatus, system, and method reduce false errors during the boot cycle, improve reliability of the multipathed network, simplify traffic load balancing, and provide for topology mapping for troubleshooting and network metrics. The disclosed embodiments provide a means for verifying multipathed targets automatically, without requiring user assistance, intervention, or interaction.

34 Claims, 9 Drawing Sheets

U.S. PATENT DOCUMENTS

| | | | |
|---|---|---|---|
| 2003/0140210 A1 | 7/2003 | Testardi | 711/203 |
| 2003/0191932 A1 | 10/2003 | Allen et al. | |
| 2004/0025052 A1* | 2/2004 | Dickenson | 713/201 |
| 2004/0078521 A1 | 4/2004 | Hawks et al. | |
| 2004/0117438 A1* | 6/2004 | Considine et al. | 709/203 |
| 2004/0162880 A1* | 8/2004 | Arnone et al. | 709/206 |
| 2004/0177133 A1 | 9/2004 | Harrison et al. | |
| 2004/0193683 A1* | 9/2004 | Blumofe | 709/204 |
| 2005/0013441 A1 | 1/2005 | Klein | |
| 2005/0015459 A1* | 1/2005 | Gole et al. | 709/212 |
| 2005/0015460 A1 | 1/2005 | Gole et al. | 709/213 |
| 2005/0044162 A1 | 2/2005 | Liang et al. | |
| 2005/0138346 A1 | 6/2005 | Cauthron | |
| 2005/0216421 A1* | 9/2005 | Barry et al. | 705/64 |
| 2005/0216668 A1 | 9/2005 | Kobayashi et al. | |
| 2005/0249196 A1* | 11/2005 | Ansari et al. | 370/352 |
| 2006/0015513 A1 | 1/2006 | Poyhonen et al. | |
| 2006/0085522 A1 | 4/2006 | Spry | |
| 2006/0218252 A1 | 9/2006 | Ford | |
| 2007/0180509 A1 | 8/2007 | Swartz et al. | |

FOREIGN PATENT DOCUMENTS

| | | | |
|---|---|---|---|
| WO | | 0161904 A1 | 8/2001 |
| WO | WO 2004/038699 | | 5/2004 |

OTHER PUBLICATIONS

"User Selectable Boot Process", IBM TBD vol. 38, No. 1, Jan. 1995, pp. 377-378.
"Unconditional Installation of SCSI Device Drivers", IBM TDB, vol. 37, No. 4a, Apr. 1994, pp. 153-154.
PCT/EP2006/069490 International Search Report and Written Opinion dated Jul. 5, 2007.
Office Action for U.S. Appl. No. 11/300,961 dated Apr. 2, 2010.
R. Droms, "RFC 2132—Dynamic Host Configuration Protocol", Mar. 1997.
S. Alexander et al., "RFC 2132—DHCP Options and BOOTP Vendor Extensions", Mar. 1997.
R. Droms et al., "RFC 3118—Authentication for DHCP Messages", Jun. 2001.
Office Action for U.S. Appl. No. 11/304,852 dated Dec. 23, 2009.
'iSCSI Security SRP,' "Real Storage" website, p. 1, (became aware of art on Nov. 14, 2006).
"iSCSI," iSCSI=a Whatis.com definition p. 1-3, downloaded on Jul. 22, 2005.
Duncan Missimer, ' Bootstrapping Clients using the ISCSI Protocol,' IP Storage Working Group Memo, p. 1-12, Mar. 18, 2004.
David Black, 'iSCSI boot-DHCP Root Path Option,' Mailing List Archive-email , Sep. 17, 2002.
Britt Bolen, This mini-Howto tries explains how to set up a . . . http://eludicate.com/~bolen/iscsi/, V2.0.1, Jan. 22, 2005.
Prasenjit Sarker, 'Status of iSCSI Boot,' http://www.ietf.org/proceddings/01dec/slides/ips-12/sId001.htm, slide 1-20, Apr. 16, 2006.
Industry's first native iSCSI tape libraries,' Library Feature, 4.1.iscsi. Apr. 20, 2003.
Bernard Adoba, ' I-D Action: draft-ietf-ips-iscsi-boot-09.txt,' Mailing List Archive-email, p. 1-4, downloaded on Mar. 24, 2005.
Office Action for U.S. Appl. No. 11/304,852 dated Jul. 22, 2010.
"Remote Supervisor Adapter II SlimLine and Remote Supervisor Adapter II: User's Guide", IBM, Fourth Edition, Sep. 2004 in Japanese and English.

* cited by examiner

APPARATUS, SYSTEM, AND METHOD FOR AUTOMATICALLY VERIFYING ACCESS TO A MULTIPATHED TARGET AT BOOT TIME

BACKGROUND OF THE INVENTION

1. Field of the Invention

This invention relates to multipathing of networked storage devices and more particularly relates to automatically verifying access to a multipathed target device while booting a computing device.

2. Description of the Related Art

Modern data storage systems typically contain data that is valuable to the storage system user. Consequently, high reliability of such data and the storage systems containing the data is a necessary feature of most computing systems. Many methods for improving the reliability of data storage systems have been developed, including redundant data storage systems incorporating methods for mirroring the data stored on separate systems, backup operations for creating emergency backup copies of data for use in case of storage system failure, and the like. In networked storage systems, the backup data, or mirrored data may be stored on separate storage devices.

For example, an application server may store application data on a Storage Area Network ("SAN") containing a plurality of mirrored data storage devices. In this example, the application server may store data on a primary storage system, and the data may be automatically copied to a separate mirrored storage system. Alternatively, the data may be copied to a separate mirrored hard disk within the same storage system. In such an example, the data is communicated from the application server to the storage system, and between storage systems using networking configurations such as Small Computer System Interface ("SCSI"), Fibre Channel Arbitrated Loop ("FC-AL"), internet SCSI ("iSCSI"), and the like.

Another aspect of data storage system reliability is availability. Optimally, the availability of the storage system to other computing systems should remain uninterrupted. However in networked systems, constant availability is difficult to achieve. It is difficult to maintain uninterrupted access to the storage system, because the SAN typically routes data traffic through a plurality of devices before reaching the storage system. For example, data sent from an application server to a storage system may pass through multiple switches, routers, hubs, and the like before reaching the storage system and its associated storage disks. If there is a failure in any of the devices between the application server and the storage disk, the data will not be stored properly, if at all, on the storage disk. Consequently, data may be lost, or the application server may be taken off line during the failure, and the availability of the application, and integrity of the data will be impacted.

One method for preventing outages due to failures within a SAN is multipathing. As used herein, the term "multipathing" refers to the establishment and maintenance of multiple data paths between a first networked computing device and a second networked computing device. The presence of multiple data paths provides an added measure of redundancy on the data communication link between the first networked computing device and the second networked computing device. Thus, if a switch, router, or other networking component between the first networked computing device and the second networked computing device fails, the connection will not be lost. Instead, the data path will automatically switch to the path that is operational.

In typical SAN systems, the multipathing between the first and the second networked computing devices is managed by a multipathing agent that runs in the operating system of one or both of the computing devices. In typical systems, multiple data paths are not available until the operating system boots, and the multipathing agent is initiated. In such systems, the multipathing agent may control the data ports and interfaces of the machine on which it is running. These data interfaces may include SCSI, Fibre Channel, iSCSI, and the like.

One problem with the current model for implementing multiple data paths is an inability to verify connections on multiple data paths during the system boot procedure. For example, in a system using iSCSI data communications, only a predefined primary path may be verified to check the availability of a storage system or other peripheral device during the boot procedure. In current systems, the iSCSI initiator would use the iSCSI basic parameter data structure to get an Internet Protocol ("IP") address for a target iSCSI storage device.

If the device is not reachable on the primary data path specified by the IP address, the iSCSI initiator module returns an error, and the system fails to boot properly. However, the target storage device may be operational despite the failure to connect on the primary data path. The failure may have occurred on a switch between the booting system and the target storage device. In such an example, it would be useful to verify access to the target storage device through multiple data paths. Thus, if a target storage device is unavailable on the primary data path, a redundant data path may be checked to further verify accessibility of the target device. Consequently, the iSCSI initiator would return less errors, and the system would boot properly more consistently.

From the foregoing discussion, it should be apparent that a need exists for an apparatus, system, and method that automatically verify access to a multipathed target at boot time.

SUMMARY OF THE INVENTION

The present invention has been developed in response to the present state of the art, and in particular, in response to the problems and needs in the art that have not yet been fully solved by currently available boot processes and iSCSI initiation drivers. Accordingly, the present invention has been developed to provide an apparatus, system, and method to automatically verify access to a multipathed target at boot time that overcome many or all of the above-discussed shortcomings in the art.

One embodiment of the apparatus to automatically verify access to a multipathed target at boot time is provided with a plurality of modules configured to functionally execute the necessary steps of identifying a plurality of paths to a target device, automatically selecting one of multiple paths to the target device, and verifying access on at least one path to the target device. These modules in the described embodiments include an identification module, a selection module, and a verification module. In a further embodiment, the apparatus is configured to verify access to the target device through an internet SCSI ("iSCSI") communication port.

In a further embodiment, the identification module further comprises a receive module configured to receive a data structure containing identification information from a remote configuration manager. The identification information may comprise at least one of an Internet Protocol ("IP") address, a communication port identifier, an iSCSI name, a login identifier, and a password for the target device. Additionally, the identification module may comprise a wizard module configured to identify and automatically generate a data structure containing identification information for a plurality of targets.

The identification module may be further configured to identify target paths independently of the operation status of a computing device.

In certain embodiments, the selection module further comprises a retrieving module configured to retrieve a data structure containing identification information form a nonvolatile storage location in response to initiation of a boot process. In one further embodiment, the receiving module is configured to retrieve a data structure containing iSCSI target identification information from a nonvolatile storage location in response to starting an iSCSI initiator process. Additionally, the selection module may be further configured to select a new target for verification in response to a failed attempt to connect to a previous target.

A system of the present invention is also presented to automatically verify access to a multipathed target at boot time. In one embodiment, the system includes a remote configuration manager configured to automatically generate a data structure containing identification information for a plurality of data communication paths between a computing device and one or more target devices. Additionally, the system includes a computing device configured to identify a plurality of paths to a target device, automatically select one of multiple paths to the target device, and verify access on at least one path to the target device. In a further embodiment, the system additionally includes a target device in multipathed data communication with the computing device.

In one embodiment, the remote configuration manager further comprises a configuration wizard configured to identify and automatically generate a data structure containing identification information for a plurality of target devices. The remote configuration manager may be further configured to identify and automatically generate a data structure containing identification information for a plurality of data communication paths between a computing device and a plurality of target devices, wherein the target devices are configured to mirror data.

In certain embodiments, the remote configuration manager is further configured to communicate the data structure containing identification information on an out of band communication link for storage in a nonvolatile storage location on the computing device. Additionally, the remote configuration manager may be configured to generate a mapping of multiple paths between the computing device and one or more target devices, and automatically generate a set of data structures containing the mapping information.

In one embodiment, the computing device is further configured to automatically select a new target for verification in response to a failed attempt to connect to a previous target. In one particular embodiment, multiple paths between the computing device and the target device are verified during the boot process of the computing device in preparation for data communication load balancing on the multiple paths.

A method of the present invention is also presented to automatically verify access to a multipathed target at boot time. The method in the disclosed embodiments substantially includes the steps necessary to carry out the functions presented above with respect to the operation of the described apparatus and system. In one particular embodiment, the method may comprise identifying a plurality of paths from a computing device to a target device while the computing device is operational, automatically selecting one of multiple paths to the target device when the computing device is rebooted, and verifying access on at least one path to the target device.

In a further embodiment, the verifying further comprises abandoning an attempt to connect to the target device subsequent to the passing of a predetermined timeout period. Verifying may additionally include retrying an attempt to connect to the target device a predetermined number of times before declaring a failure to connect. Additionally, the method may further comprise producing an error message in response to the verification operation failing to connect to the target device.

Additionally, a method for providing a service of the present invention is presented. The method in the disclosed embodiments includes remotely identifying multiple paths between a client computing device and a target device, automatically selecting paths to verify, verifying one or more paths between the client computing device and the target device, and returning the status of the paths to the client computing device during the boot process of the client computing device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
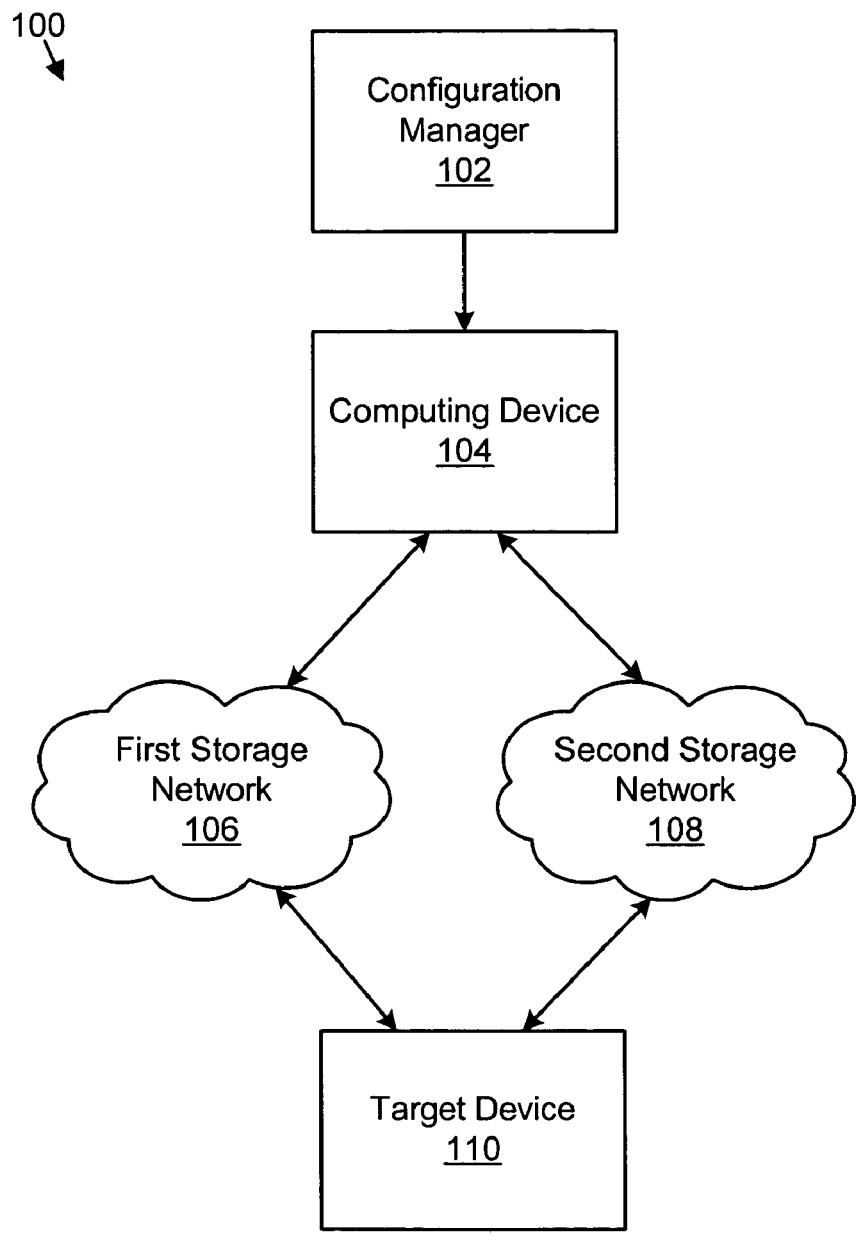
FIG. 1 is a schematic block diagram illustrating one embodiment of a system to automatically verify access to a multipathed target at boot time.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, the term "SCSI" refers to a block protocol used to access storage devices. The protocol is a command response protocol used to interact with the storage device directly, to determine status and maintain control, as well as to interact with the storage device to read and write data. The term "iSCSI" refers to internet based SCSI, which simply uses a TCP/IP network in place of the typical direct cable connections to communicate the SCSI operations. The SCSI commands may be encapsulated in TCP/IP frames.

As used herein, the term "out of band" includes the use of a data communication link separate from the primary data communication medium employed on a system for passing configuration information. This out of band access link may be used to configure security settings, or to perform other configuration, recovery, or like tasks without establishing the primary data transaction medium. For example, a storage system connected to an iSCSI transaction network may receive configuration settings through a parallel or serial data port using RS-232 data transfer protocol. In this example, the RS-232 port is an out of band port and the iSCSI port is an in band port.

FIG. 1 depicts one embodiment of a system 100 to automatically verify access to a multipathed target at boot time. The system 100 includes a remote configuration manager 102, a computing device 104, a first SAN 106, a second SAN 108, a target device 110, and a plurality of data storage disks 112.

In one embodiment, the remote configuration manager 102 is connected to the computing device 104 via an out of band communication link. For example, the remote configuration manager 102 may use an RS-232 connection, an RS-485 connection, an Ethernet connection, a wireless connection, or the like to communicate configuration and multipath identification information to the computing device 104. In one embodiment, the remote configuration manager 102 is an xSeries™ server management module available from International Business Machines ("IBM"). In an alternative embodiment, the remote configuration manager 102 may include a laptop computer, a Personal Computer ("PC") workstation, a separate management server, or the like.

In one embodiment, the computing device 104 is an IBM xSeries™ server blade. In an alternative embodiment, the computing device 104 may include any device possessing a data processing module and capable of communicating data over a SAN 106, 108 to a target device 110. Examples include workstations, application servers, clustered computation devices, and the like. The computing device 104 is discussed in more detail with respect to FIGS. 2-3.

The computing device 104 may be connected to one or more SANs 106, 108 and configured to communicate data to the target device 110. In one embodiment, the computing device 104 may be connected to the SANs through an iSCSI storage fabric. Alternatively, the SANs 106, 108 may use a FC-AL fabric for data communication. In one further embodiment, the SANs 106, 108 may use Ethernet for data communication. The SANs 106, 108 may include data routers, switches, hubs, and the like. Typically a SAN is defined by a group of IP addresses on a single subnet.

A single device such as the computing device 104 or the target device 110, for example, may be connected to multiple SANs 106, 108 simultaneously. In such an embodiment, multiple IP addresses and associated data paths are created for each device. In this embodiment, data sent from the computing device 104 to the target device 110 may travel through different network components on the first SAN 106 than on the second SAN 108. Thus, multiple data paths between the two devices are established.

The target device 110 may include a data storage system with one or more associated disk drives, a peripheral expiation module such as an extended PCI module, or the like. Indeed, the target device 110 may include any device whose connectivity on a plurality of data communication paths is verified by the BIOS boot process of the computing device 104 when the computing device 104 is booted.

As discussed in the following paragraphs, the system 100 and associated apparatus and methods overcome many of the shortcomings in the art by allowing the computing device 104 to verify access to the target device 110 through either the first storage network 106 or the second storage network 108 at boot time. Thus, the present invention in certain embodiments reduces the number of false errors arising at boot time when one of the paths to the target device 110 is unavailable.

Figure 2:
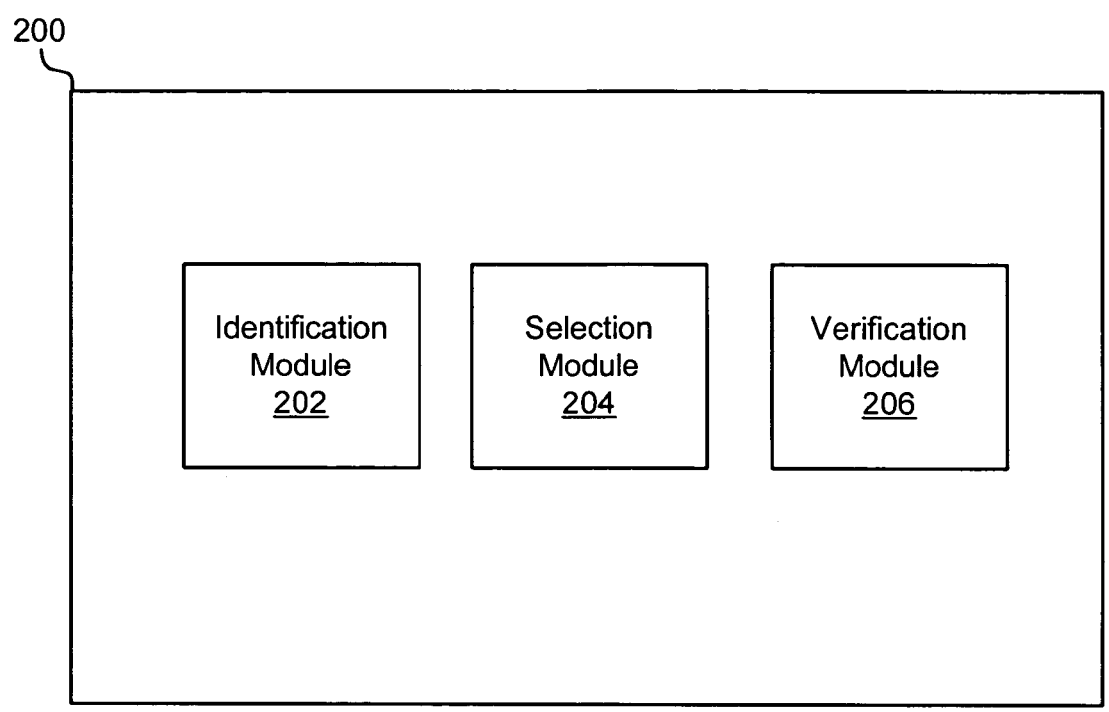
FIG. 2 is a schematic block diagram illustrating one embodiment of an apparatus to automatically verify access to a multipathed target at boot time.

FIG. 2 illustrates one embodiment of an apparatus 200 to automatically verify access to a multipathed target 110 at boot time. The apparatus 200 includes an identification module 202, a selection module 204, and a verification module 206. These modules allow the device drivers of the computing device 104 to verify multiple paths to the target device 110 during the boot process carried out by the system Basic Input Output Software ("BIOS") prior to the operating system taking control of the computing device 110.

In one embodiment, the identification module 202 is configured to identify a plurality of paths to a target device 110. In one embodiment, the identification module 202 may scan the ports of the computing device for connections to target devices at various addresses on various SANs 106, 108. Alternatively, the identification module may provide an interface to receive user input regarding the configuration of the system 100. In another alternative embodiment, the identification module 202 may receive configuration information from a remote configuration manager 102. Additional embodiments may exist, each possessing the common characteristic of generating configuration information regarding the SAN topology with respect to the computing device 104.

The selection module 204 is configured to automatically select one of multiple paths to the target device 110. As used herein, the term "automatically" includes performing an action independent of external influence, interaction, or instruction. Although the selection may be performed automatically, user interaction is not precluded. Indeed, the selection may be made by the selection module 204 autonomously, or in response to user input and interaction. The selection module 204 selects a path to the target device 110 defined by a network address, subnet mask, and the like.

In one embodiment, the verification module 206 verifies access to the target device 110 on at least one path selected by the selection module 204. The verification module 206 may attempt to login to the target device using an iSCSI communication link to verify access. In an alternative embodiment, the verification module 206 may use a Simple Mail Transfer Protocol ("SMTP") ping command to verify access to the target device 110. When attempting to access the target device 110, the verification module 206 may be configured to abandon the attempt subsequent to the passing of a predetermined timeout period. Additionally, the verification module 206 may be further configured to make multiple attempts to connect to the target device 110 in accordance with a predetermined retry count. In a further embodiment, the verification module 206 may be further configured to produce an error message in response to the verification operation failing to connect to the target device 110.

Figure 3:
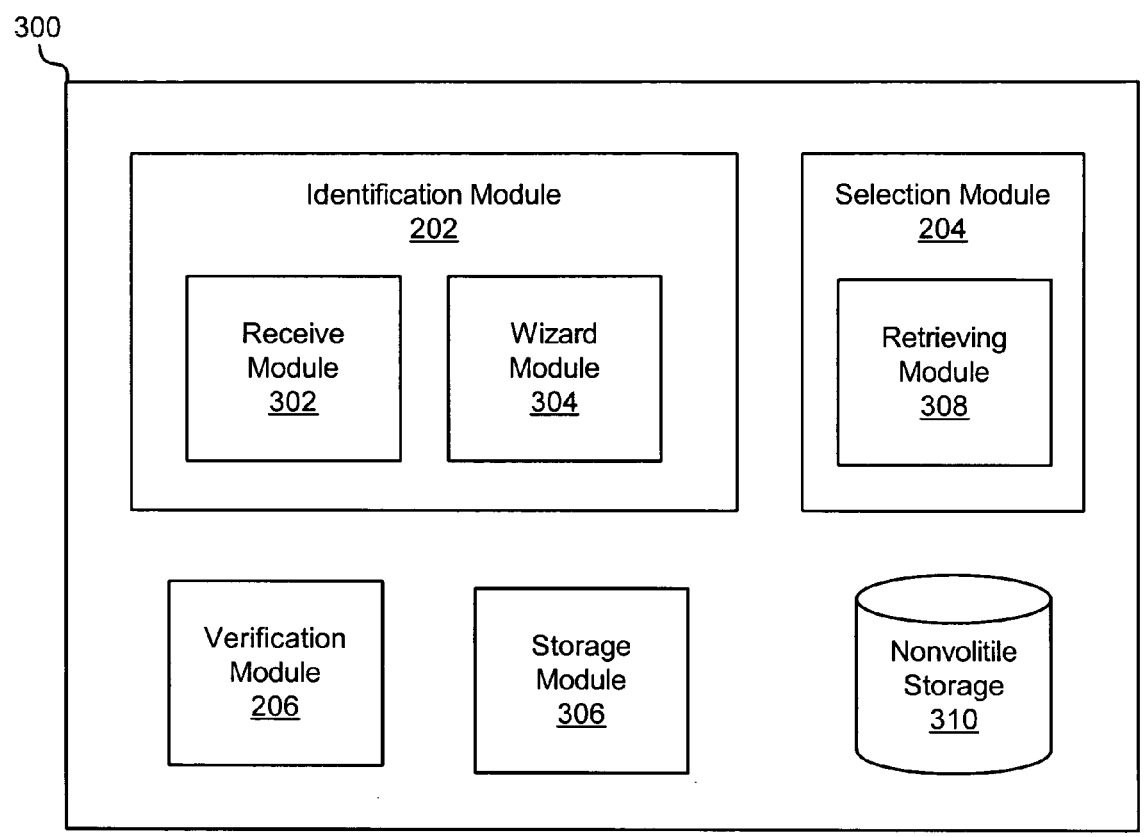
FIG. 3 is a detailed schematic block diagram illustrating one embodiment of an apparatus to automatically verify access to a multipathed target at boot time.

FIG. 3 depicts another embodiment of an apparatus 300 to automatically verify access to a multipathed target 110 at boot time. In one embodiment, the apparatus 300 is incorporated with the computing device 104. The apparatus 300 includes the identification module 202, selection module 204, and verification module 206, wherein these modules include substantially the same features as described above with relation to FIG. 2.

Additionally, the identification module 202 further comprises a receive module configured to receive a data structure containing identification information from a remote configuration manager 102. In certain embodiments, the identification module 202 further comprises a wizard module 304 configured to identify and automatically generate a data structure containing identification information for a plurality of target devices 110. Specific details of the data structure and the identification information contained by the data structure are discussed below with relation to FIG. 6.

In one embodiment, the apparatus 300 further comprises a storage module 306 configured to store the data structure in a nonvolatile storage location 310. The nonvolatile storage 310 may be a hard disk, a continuously powered Random Access Memory ("RAM"), a flash memory device, or the like. In a further embodiment, the selection module 204 comprises a retrieving module 308 configured to retrieve the data structure from the storage 310.

The wizard module 304 may comprise a user interface, a network or fabric interface, and logic necessary to automatically generate a data structure containing target path information discovered during wizard operation. The wizard may require user interaction to generate the data structure. Alternatively, the wizard module 304 may automatically scan the network or fabric and map the connection topology.

In certain embodiments, where the remote configuration manager 102 is not present, the wizard module 304 is configured to identify the paths and generate the data structure to be stored in memory 310. However, where the remote configuration manager 102 is present, the receive module 302 is configured to receive the data structure from the configuration manager 102 and its associated configuration wizard. In both embodiments, the storage module 306 is configured to store the data structure in a nonvolatile storage 310 for use on the next system boot.

When the system is rebooted, the retrieving module 308 is configured to retrieve the data structure containing the identification information gathered previously for use with the system boot procedure. For example, in a system 100 using iSCSI communication between the computing device 104 and the target device 110, the data structure may contain an IP address, port identifier, login ID, password, and the like for a plurality of data paths to the target 110. The retrieving module 308 may retrieve the data structure when the iSCSI initiator module of the boot procedure is started. The other modules of the apparatus 300 may then use this information to verify access to the target 110 on one or more paths. The presence of this previously stored data structure makes it possible to verify multipath access to the target device 110 during system boot, without requiring user intervention.

Figure 4:
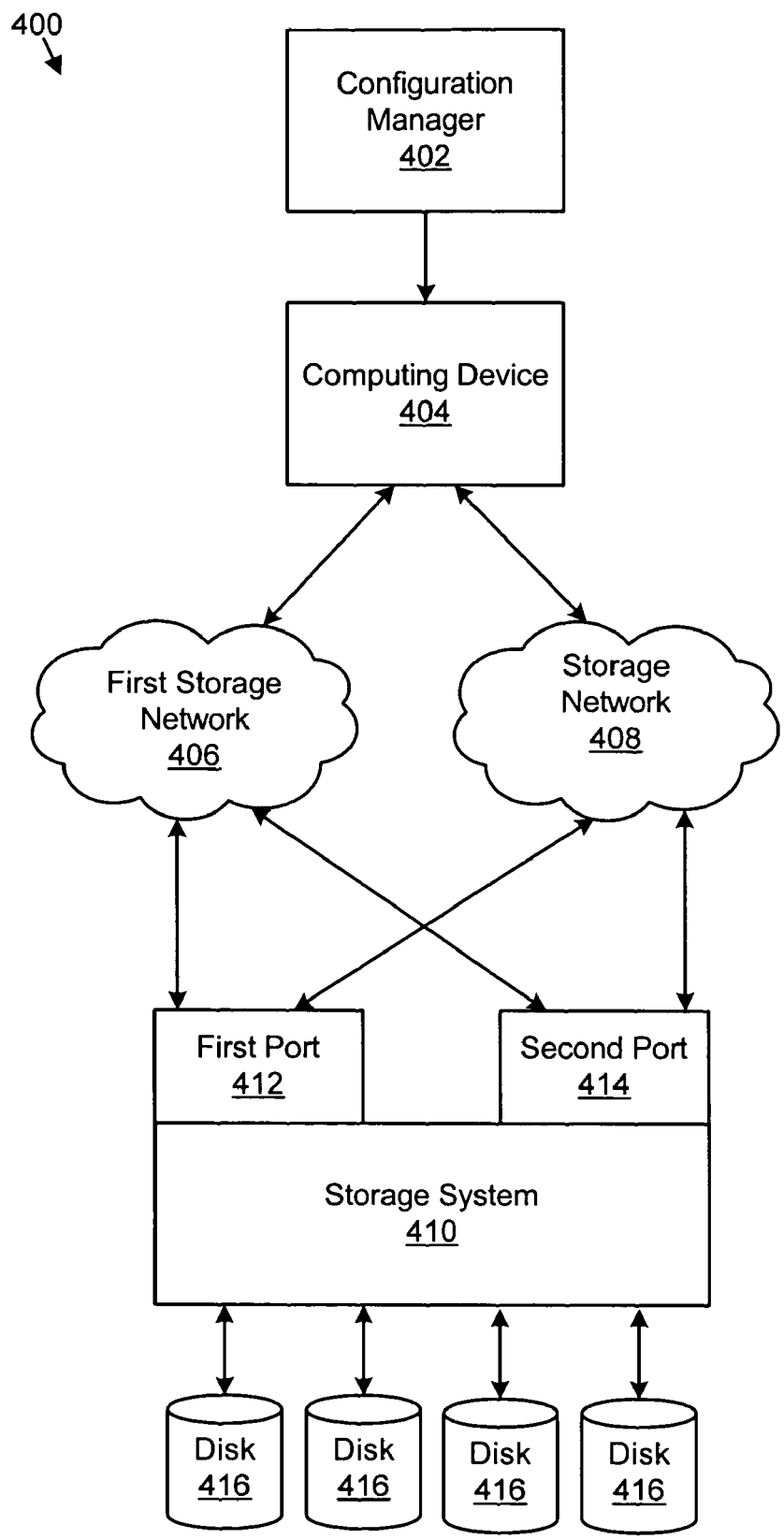
FIG. 4 is a schematic block diagram illustrating a system in accordance with the present invention, wherein the targets are separate ports on the same storage system.

FIG. 4 depicts another embodiment of a system 400 for automatically verifying access to a target 412, 414 during boot time. In the depicted embodiment, the configuration manager 402 the computing device 404, the first storage network 406, and the second storage network 408 operate in substantially like manner as that of the system 100 described with relation to FIG. 1. Additionally, the depicted embodiment includes a storage system 410. In one embodiment, the storage system includes a first data communication port 412 and a second data communication port 414. Additionally, a plurality of storage disks 416 may be associated with the storage system 410.

In one embodiment, the configuration manager 402 may communicate with the computing device 404 on a secure data communication link. For example, the configuration manager 402 may establish an encrypted channel using Secure Shell ("SSH"), or the like. In such an embodiment, the configuration manager 402 may communicate the data structure containing login identifiers, passwords, and the like to the computing device without exposing the network to potential internet predators.

Additionally, in the depicted embodiment, the first port 412 and the second port 414 become separate targets even though they belong to the same storage system 410. A port may include a TCP port, fibre channel port, or the like. Since each port has separate and distinct identification information, the ports 412, 414 become separate targets. Additionally, a redundant connection may be created through two separate SANs 406, 408 for a highly reliable and redundant multipathed network. Indeed, sixteen different paths to the storage system 410 are depicted. Beneficially, each of the sixteen different paths may be verified at boot time if the computing device comprises the apparatus 200, 300 to automatically verify access to a multipathed target at boot time.

If a data structure contains identification information for two target paths, the depicted embodiment may be completely mapped with four data structures. Therefore, a complete topographical map of the multipathed connection between the computing device 404 and the storage system 410 may be stored in memory 310 with four data structures.

Figure 5:
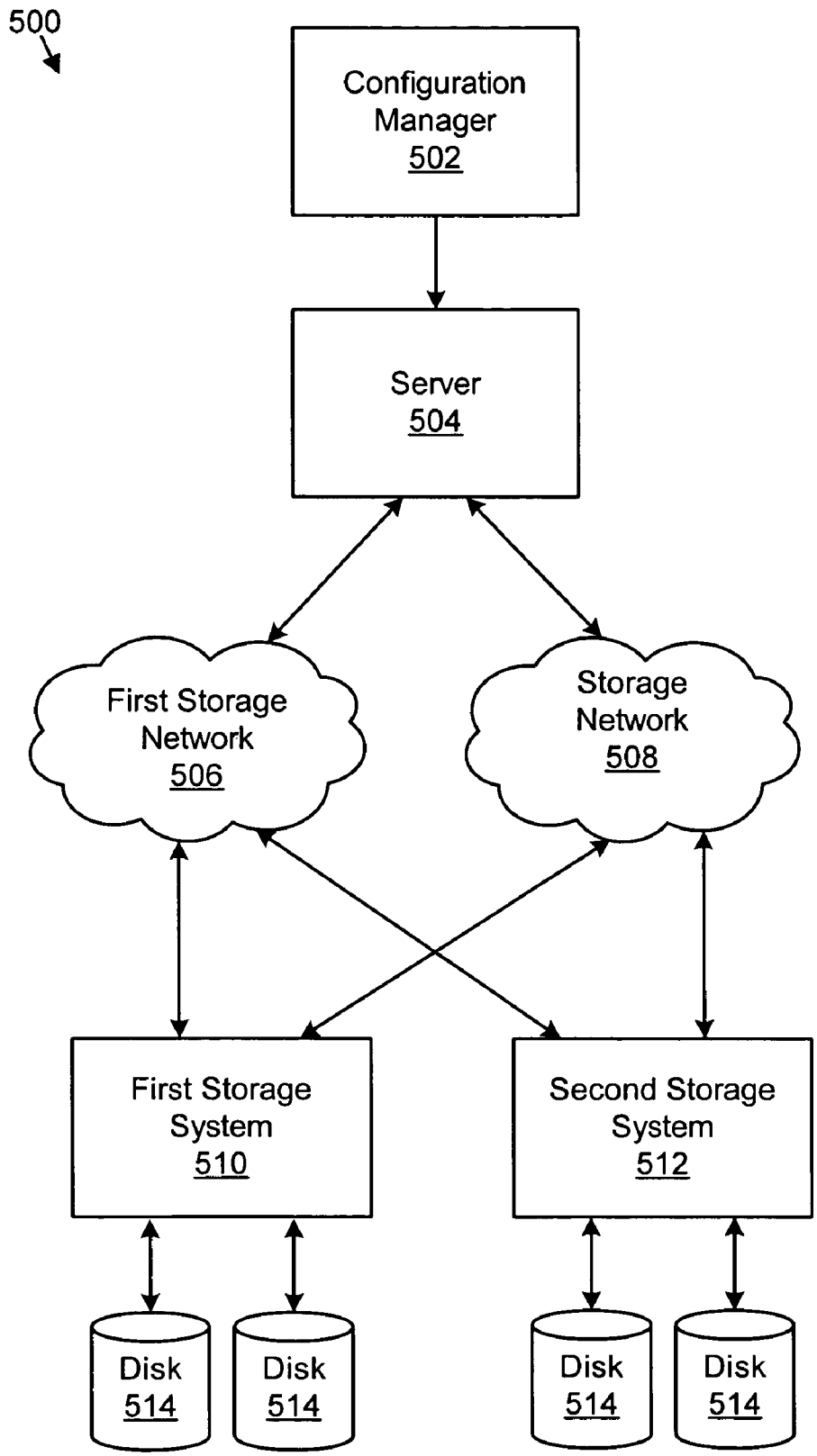
FIG. 5 is a schematic block diagram illustrating a system in accordance with the present invention, wherein the targets are separate storage systems.

FIG. 5 depicts one further embodiment of a system 500 to automatically verify access to a multipathed target at boot time. In the depicted embodiment, two separate and distinct targets 510, 512 are multipathed to a server 504. Each target is a storage system 510, 512. Each storage system may comprise a plurality of storage disks. In such an embodiment, the storage systems are preferably mirrored for data redundancy. The first storage system 510 and the second storage system 512 may be mirrored asynchronously or synchronously. The mirroring may be communicated over either the first SAN 506 or the second SAN 508. Alternatively, the mirroring may be communicated over a direct connection.

In one embodiment, traffic from the computing device to the first storage system 510 and the second storage system 512 may be balanced over a plurality of data paths. Beneficially, each data path may be verified when the server 504 is booting to expedite data traffic load balancing configuration and operations.

Figure 6:
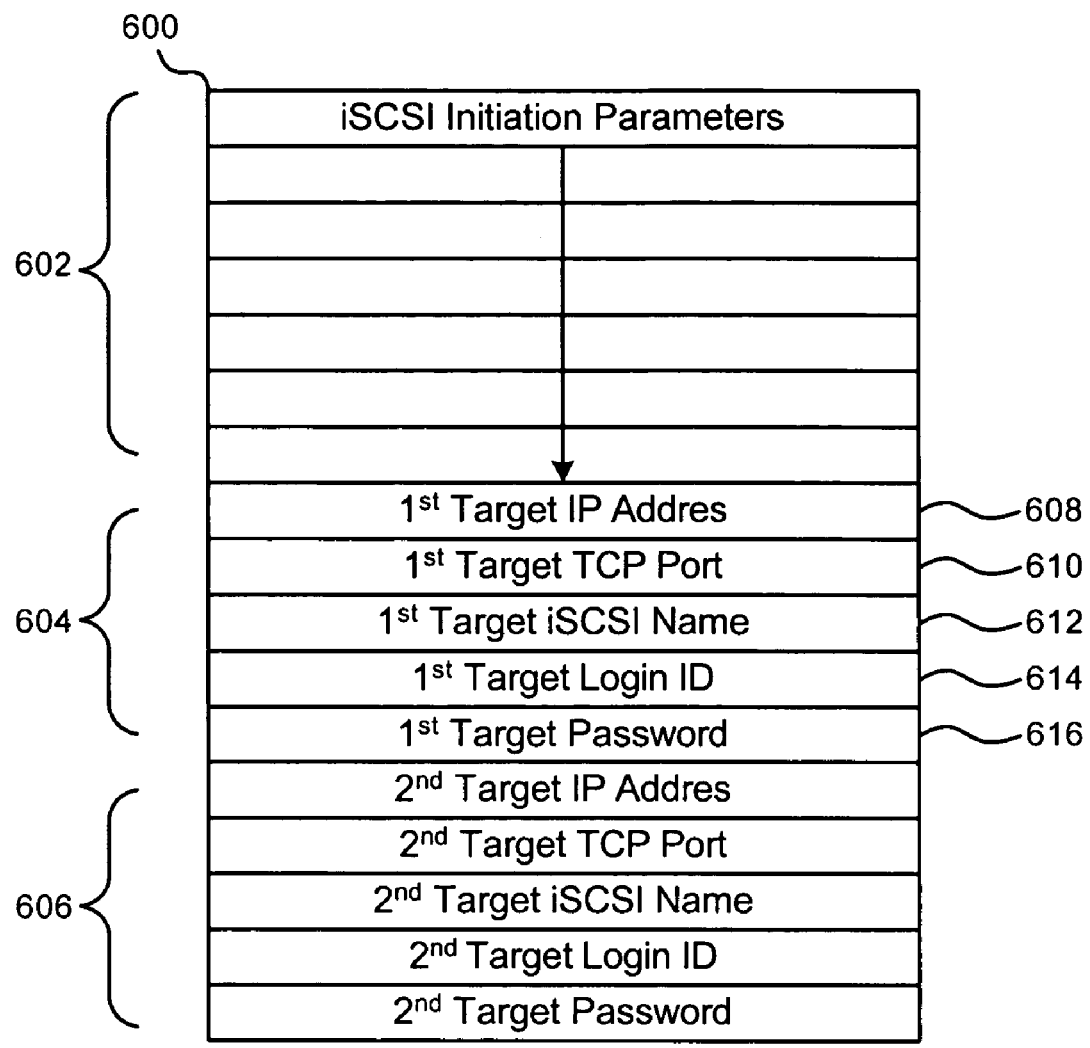
FIG. 6 is a schematic block diagram illustrating one embodiment of a data structure containing identification information.

FIG. 6 illustrates one embodiment of a data structure 600 containing identification information 604, 606. The depicted embodiment includes a set of generic iSCSI initiation parameters 602, identification information for a first target 604 and identification information for a second target 606.

The iSCSI initiation parameters 602 may include header information including a data structure version number, the length of the data structure, and the like. Additionally, the iSCSI initiation parameters 602 may include values used to determine the timeout period, and the number of times to retry an attempt to verify a connection.

The identification information for the first target 604 and for the second target 606 may include the IP address of the target, a TCP port identifier for the target, the iSCSI name of the target, a login identifier for the target, and the password for the target. In certain embodiments, additional parameters specific to the computing device 104 or the target 110 may be included.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
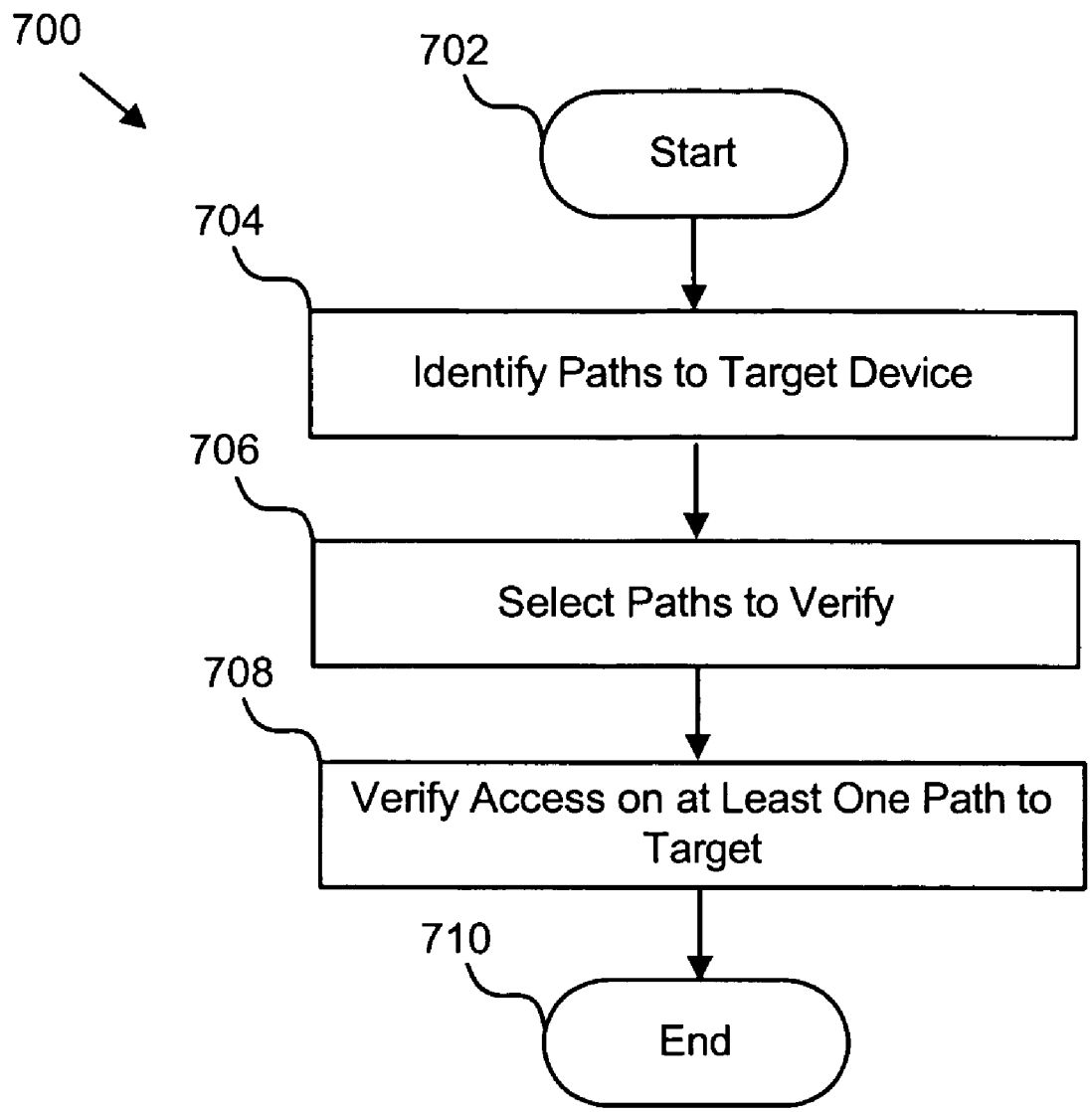
FIG. 7 is a schematic flow chart diagram illustrating one embodiment of a method to automatically verify access to a multipathed target at boot time.

FIG. 7 illustrates one embodiment of a method 700 to automatically verify access to a multipathed target 110 at boot time. The method 700 starts 702 when the identification module 202 identifies 704 multiple paths to the target device 110. The selection module 204 then automatically selects 706 one of the paths to verify 708. The verification module 206 verifies 708 access to the target device 110 on at least one path selected by the selection module 204, and the method ends 710.

For example, the computing device 104 may further comprise the apparatus 200 for automatically verifying access to a multipathed target 110 at boot time. The method 700 may start 702 when the iSCSI initiator module of the boot process carried out by the system BIOS starts. The identification module 202 may then identify 704 a first path to the target device 110 through the first storage network 106, and a second path through the second storage network 108. The selection module 204 may then automatically select 706 the first path for verification 708. The verification module 206 may then attempt to verify 708 access to the target device 110 through the first storage network 106. If the attempt fails, the selection module 204 may automatically select 706 the second path for verification 708. The verification module 206 may then attempt to verify 708 access to the target device 110 through the second storage network 108, and the method ends 710.

Figure 8:
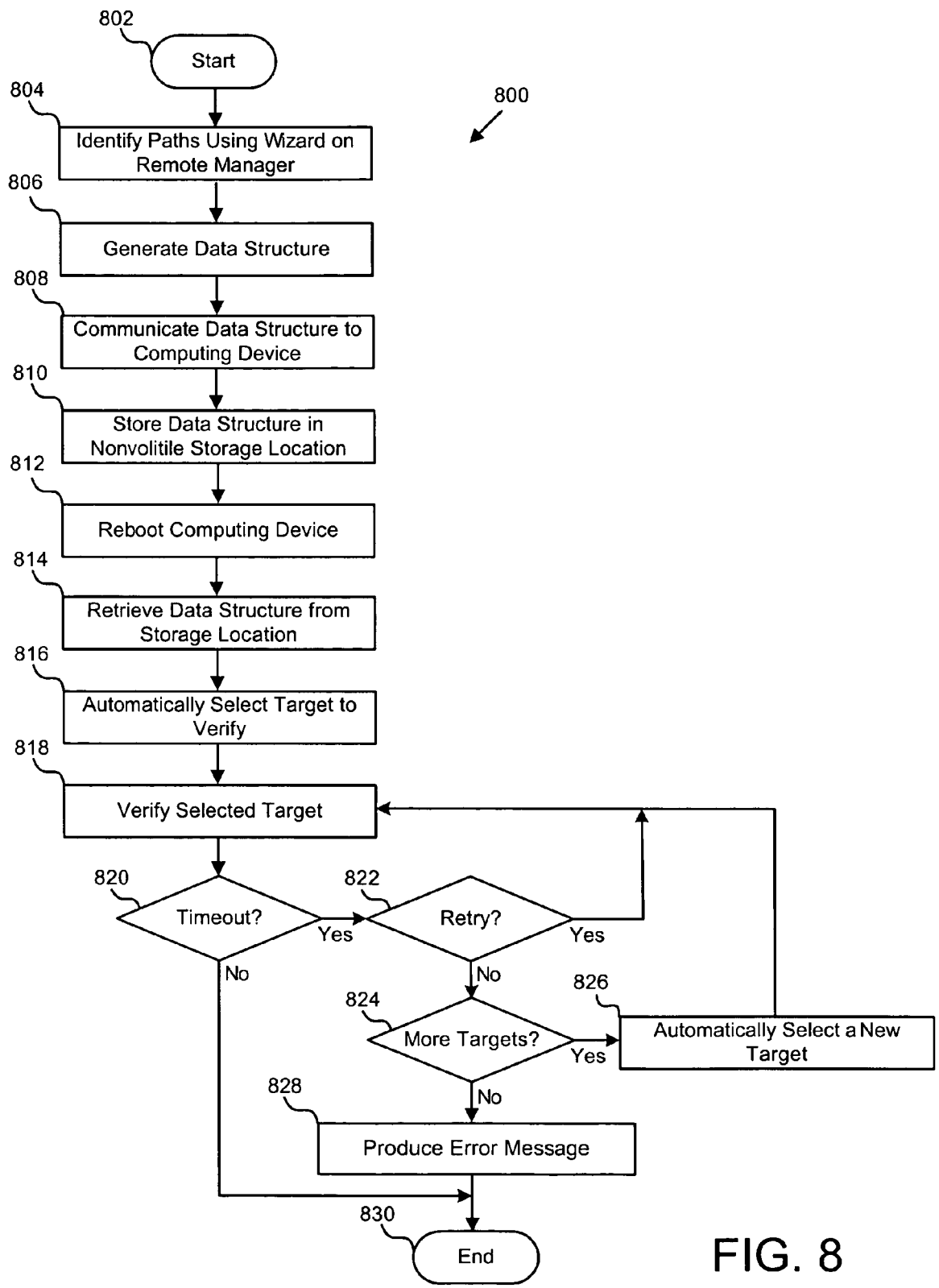
FIG. 8 is a detailed schematic flow chart diagram illustrating one embodiment of a method to automatically verify access to a multipathed target at boot time.

FIG. 8 illustrates a detailed embodiment of a method 800 to automatically verify 818 access to a target device 110 at boot time. The method 800 starts 802 when a multipath configuration wizard running on a remote configuration manager 102 identifies 804 a plurality of paths between the computing device 104 and the target device 110. The wizard then automatically generates 806 a data structure 600 containing identification information 604, 606 for a plurality of target paths or targets 510, 512.

The remote configuration manager 102 may then communicate 808 the data structure 600 to the computing device 104. The receiving module 302 may receive the data structure and pass it to the storage module 306. The storage module 306 may then store 810 the data structure in a nonvolatile storage 310 such as flash memory, or the like. The operations 804-810 described above may be carried out while the computing device 104 is operational.

Upon reboot 812 of the computing device 104, the retrieving module 308 may retrieve 814 the data structure 600 from the nonvolatile storage 310. The selection module 204 may then automatically select 816 a path to the target 110 to verify 818. The verification module 206 then verifies 818 the selected path to the target 110. In one embodiment, if the verification module 206 successfully connects to the target 110 and does not timeout 820, the method ends 830. Alternatively, the verification module 206 may attempt to verify 818 each of the identified 804 paths to the target 110 or targets 510, 512.

If the attempt to verify 818 the selected target 110 times out 820 and the verification module 206 is authorized to retry 822, the verification module 206 attempt to verify 818 connection to the target 110 again. If the verification module 206 is not authorized to retry 822, the selection module 204 determines 824 if more target paths exist. If so, the selection module 204 automatically selects a new target 110, and the verification module 206 attempts to verify 818 the new path to the target 110 until a connection is made. If no additional targets exist 824, the verification module 206 produces 828 an error message, the boot process may fail to proceed properly, and the method ends 830.

Figure 9:
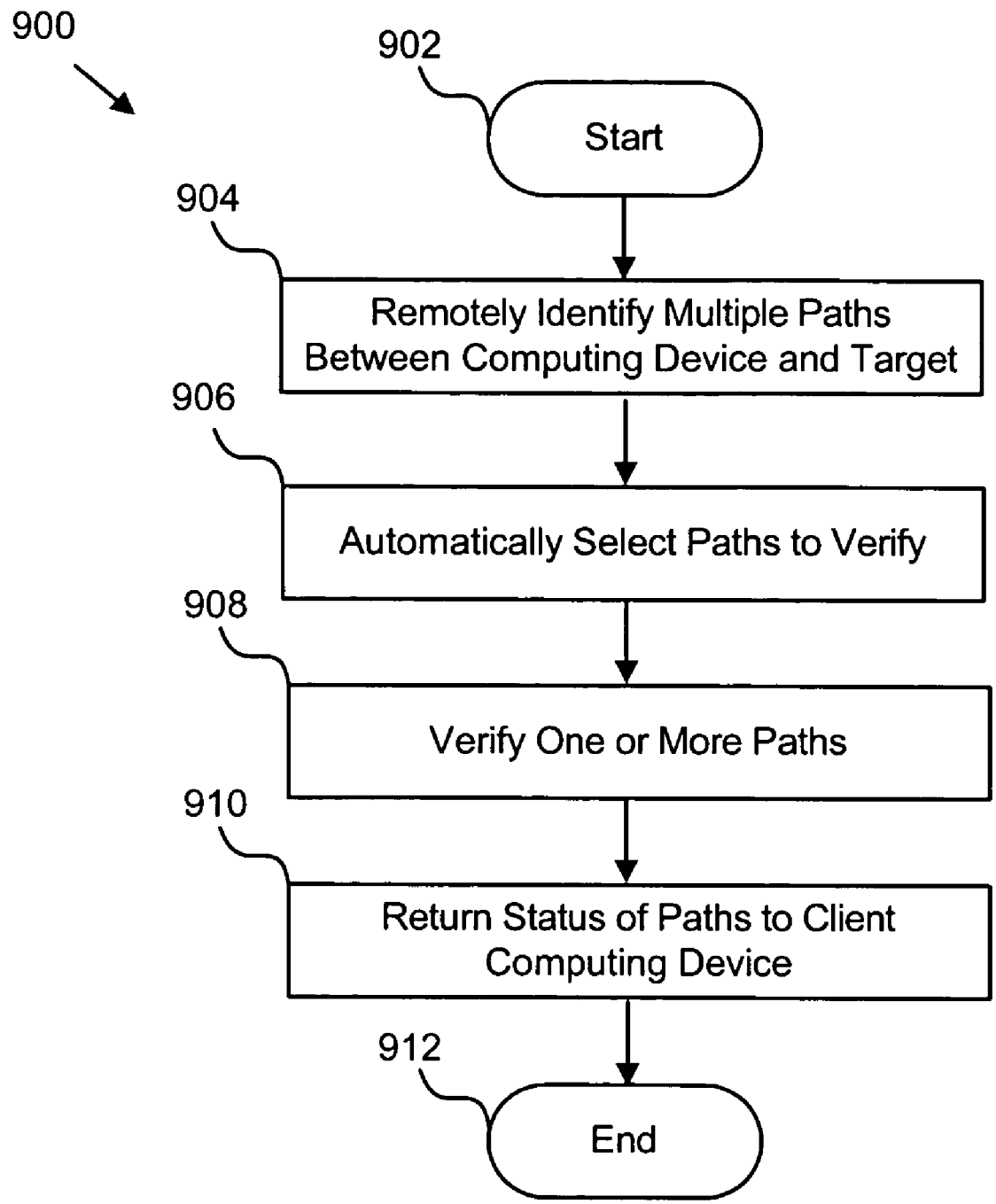
FIG. 9 is a schematic flow chart diagram illustrating one embodiment of a method for providing a service to automatically verify access to a multipathed target at boot time.

FIG. 9 illustrates one embodiment of a method 900 for providing a service for automatically verifying access to a multipathed target at boot time. The method 900 starts 902 with remotely identifying 904 multiple paths between a computing device 104 and a target device 110. In one embodiment, remotely identifying may be carried out by a service provider using a laptop computer. Alternatively, identifying may be performed by a remote configuration manager 102.

The service provider may then automatically select 906 paths to verify access between the computing device 104 and the target device 110. The service provider may then verify 908 one or more paths between the computing device 104 and the target device 110. This may be carried out by passing data from the remote service provider, through the computing device 104 and on to the target device 110 on the selected path. The service provider may then return 910 the status of the paths to the client computing device during the boot process of the client computing device.

In certain embodiments, the service 900 may be performed between a client computing device 104 and a peripheral iSCSI target device 110 on at least one of a plurality of iSCSI paths. Additionally, identification 904 may be performed while the client computing device 104 is operational, and the identified paths are verified 908 when the client computing device 104 is rebooted.

Beneficially, the disclosed embodiments of the apparatus, system, and method to automatically verify access to a target at boot time reduce false errors during the boot cycle, improve reliability of the multipathed network, simplify traffic load balancing, and provide for topology mapping for troubleshooting and network metrics. Furthermore, the described embodiments overcome the shortcomings in the art by providing a means for verifying multipathed targets automatically, without requiring user assistance, intervention, or interaction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to automatically verify access to a multipathed target at boot time, the apparatus comprising:
a processor and a memory connected to the processor, the memory comprising:
an identification module configured to identify a plurality of network paths from a computing device to a target data storage device during a Basic Input Output Software ("BIOS") boot process of the computing device, each of the plurality of network paths providing a path to the target data storage device such that access to target data stored on the target data storage device is available via each of the plurality of network paths, wherein the target data storage device is a remote storage device and wherein the computing device is configured to remotely boot an operating system from the remote target data storage device across one of the plurality of identified network paths, the identification module further configured to retrieve a data structure containing identification information in response to initiation of the BIOS boot process;
a selection module configured to automatically select at least one of the plurality of network paths to the target data storage device during the BIOS boot process; and
a verification module configured to verify access on at least one selected network path to the target data storage device during the BIOS boot process and to abandon an attempt to connect to the target data storage device in response to the passing of a predetermined timeout period, wherein the selection module is further configured to select a new network path to the target data storage device for verification in response to a failed attempt to verify access to the target data storage device using a previously selected network path.

2. The apparatus of claim 1, wherein the verification module is configured to verify access to the target data storage device via the new network path to the target device.

3. The apparatus of claim 1, wherein the identification module further comprises a receive module configured to receive the data structure containing the identification information from a remote configuration manager.

4. The apparatus of claim 3, wherein the identification information further comprises at least one of an Internet Protocol ("IP") address, a communication port identifier, an iSCSI name, a login identifier, and a password for the target data storage device.

5. The apparatus of claim 1, wherein the identification module further comprises a wizard module configured to identify and automatically generate a data structure containing identification information for a plurality of target data storage devices.

6. The apparatus of claim 1, wherein the identification module is further configured to identify target paths independently of the operation status of a computing device.

7. The apparatus of claim 1, further comprising a storage module configured to store the data structure containing identification information in a nonvolatile storage location.

8. The apparatus of claim 1, wherein the selection module further comprises a retrieving module configured to retrieve the data structure containing identification information from a nonvolatile storage location in response to initiation of the BIOS boot process.

9. The apparatus of claim 8, wherein the retrieving module is further configured to retrieve the data structure containing iSCSI target identification information from the nonvolatile storage location in response to starting an iSCSI initiator process.

10. The apparatus of claim 1, wherein the selection module is further configured to select a new target data storage device for verification in response to a failed attempt to connect to a previous target data storage device.

11. A system to automatically verify access to a multi-pathed target at boot time, the system comprising:
 a remote configuration manager configured to automatically generate a data structure containing identification information for a plurality of network paths between a computing device and one or more target data storage devices;
 a computing device configured to
  identify a plurality of network paths from the computing device to a target data storage device based on the data structure during a Basic Input Output Software ("BIOS") boot process of the computing device, each of the plurality of network paths providing a unique path to the target data storage device such that access to target data stored on the target storage device is available via each of the plurality of network paths, wherein the target data storage device is a remote storage device and wherein the computing device is configured to remotely boot an operating system from the remote target data device across one of the plurality of identified network paths;
  retrieve the data structure containing identification information in response to initiation of the BIOS boot process;
  automatically select at least one of the plurality of network paths to the target data storage device during the BIOS boot process, and
  verify access on at least one selected network path to the target device during the BIOS boot process;
  abandon an attempt to connect to the target data storage device in response to the passing of a predetermined timeout period; and
 a target data storage device in communication with the computing device, wherein the selection module is further configured to select a new network path to the target data storage device for verification in response to a failed attempt to verify access to the target data storage device using a previously selected network path.

12. The system of claim 11, wherein the computing device is further configured to verify access to the target data storage device through an internet SCSI ("iSCSI") communication link.

13. The system of claim 11, wherein the remote configuration manager further comprises a configuration wizard configured to identify and automatically generate the data structure containing identification information for a plurality of target data storage devices.

14. The system of claim 11, wherein the remote configuration manager is further configured to identify and automatically generate the data structure containing identification information for a plurality of data communication network paths between the computing device and a plurality of communication ports on a target data storage device.

15. The system of claim 11, wherein the remote configuration manager is further configured to identify and automatically generate the data structure containing identification information for a plurality of data communication network paths between the computing device and a plurality target data storage devices, wherein the target data storage devices are configured to mirror data.

16. The system of claim 11, wherein the remote configuration manager is further configured to communicate the data structure containing identification information on an out of band communication link for storage in a nonvolatile storage location on the computing device.

17. The system of claim 11, wherein the computing device is further configured to automatically select a new target data storage device for verification in response to a failed attempt to connect to a previous target data storage device.

18. The system of claim 11, wherein at least two network paths between the computing device and the target data storage device are verified during the boot process of the computing device in preparation for data communication load balancing on at least two network paths.

19. The system of claim 11, wherein the remote configuration manager is further configured to generate a mapping of multiple network paths between the computing device and one or more target data storage devices, and is configured to automatically generate a set of data structures containing the mapping information.

20. A non-transitory computer readable storage medium tangibly embodying a program of machine-readable instructions executable by a digital processing apparatus to perform an operation to automatically verify access to a multipathed target at boot time, the operation comprising:
 identifying a plurality of network paths from a computing device to a target data storage device during a Basic Input Output Software ("BIOS") boot process of the computing device, each of the plurality of network paths providing a unique path to the target data storage device such that access to target data stored on the target data storage device is available via each of the plurality of network paths, wherein the target data storage device is a remote storage device and wherein the computing device is configured to remotely boot an operating system from the remote target data storage device across one of the plurality of identified network paths;
 retrieving a data structure containing identification information in response to initiation of the BIOS boot process;
 automatically selecting at least one of the plurality of network paths to the target data storage device during the BIOS boot process;
 verifying access on at least one the selected network path to the target storage device during the BIOS boot process;
 abandoning an attempt to connect to the target data storage device in response to the passing of a predetermined timeout period; and
 selecting a new network path to the target data storage device for verification in response to a failed attempt to verify access to the target data storage device using a previously selected network path.

21. The computer readable storage medium of claim 20, further configured to verify access to the target data storage device during an internet SCSI ("iSCSI") driver initialization portion of a boot operation.

22. The computer readable storage medium of claim 21, wherein the instructions further comprise an operation to use a configuration wizard on a remote configuration manager to identify and automatically generate the data structure containing identification information for a plurality of target data storage devices.

23. The computer readable storage medium of claim 22, wherein the instructions further comprise an operation to receive the data structure containing identification information from a remote configuration manager and store the data structure in a nonvolatile storage location.

24. The computer readable storage medium of claim 23, wherein the identification information further comprises at least one of an Internet Protocol ("IP") address, a communication port identifier, a iSCSI name, a login identifier, and a password for the target device.

25. The computer readable storage medium of claim 24, further comprising retrieving the data structure containing identification information from the nonvolatile storage location in response to initiation of the BIOS boot process.

26. The computer readable storage medium of claim 20, wherein the verification operation further comprises a retry operation configured to retry an attempt to connect to the target data storage device a predetermined number of times before declaring a failure to connect.

27. The computer readable storage medium of claim 26, wherein the instructions further comprise an operation to automatically select a new network path to the target data storage device for verification in response to a failed attempt to connect to a previous network path.

28. The computer readable storage medium of claim 27, wherein the instructions further comprise an operation to produce an error message in response to the verification operation failing to connect to the target data storage device.

29. A method for automatically verifying access to a multipathed target at boot time, the method comprising:
identifying a plurality of network paths from a computing device to a target data storage device during a Basic Input Output Software ("BIOS") boot process of the computing device, each of the plurality of network paths providing a unique path to the target data storage device such that access to target data stored on the target data storage device is available via each of the plurality of network paths, the target data storage device comprising two or more mirrored data storage devices, the mirrored data storage devices storing substantially redundant data, each identified network path corresponding to a path between the computing device and a distinct mirrored data storage device, wherein the target data storage device is a remote storage device and wherein the computing device is configured to remotely boot an operating system from the remote target data storage device across one of the plurality of identified network paths;
retrieving a data structure containing identification information in response to initiation of the BIOS boot process;
automatically selecting at least one of the plurality of network paths to the target data storage device during the BIOS boot process; and
verifying access on at least one selected network path to the target data storage device during the BIOS boot process and abandoning an attempt to connect to the target data storage device in response to the passing of a predetermined timeout period, and selecting a new network path to the target data storage device for verification in response to a failed attempt to verify access to the target data storage device using a previously selected network path.

30. The method of claim 29, wherein verifying further comprises automatically verifying access to a peripheral internet SCSI ("iSCSI") target data storage device on at least one of a plurality of iSCSI paths.

31. A method for providing a service for automatically verifying access to a multipathed target at boot time to a customer, the method comprising:
remotely identifying a plurality of network paths between a client computing device and a target data storage device during a Basic Input Output Software ("BIOS") boot process of the computing device, each of the plurality of network paths providing a unique path to the target data storage device such that access to target data stored on the target data storage device is available via each of the plurality of network paths, wherein the target data storage device is a remote storage device and wherein the computing device is configured to remotely boot an operating system from the remote target data storage device across one of the plurality of identified network paths;
retrieve a data structure containing identification information in response to initiation of the BIOS boot process;
automatically selecting one or more of the plurality of network paths during the BIOS boot process;
verifying access to the target data storage device via one or more of the selected network paths during the BIOS boot process;
abandoning an attempt to connect to the target data storage device in response to the passing of a predetermined timeout period; and
returning the status of the selected network paths to the client computing device during the boot process of the client computing device.

32. The method of claim 31, wherein verifying further comprises automatically verifying access to a peripheral internet SCSI ("iSCSI") target data storage device on at least one of a plurality of iSCSI paths.

33. The method of claim 31, wherein remotely identifying a plurality of network paths between a client computing device and a target data storage device is performed while the client computing device is operational, wherein the network paths identified are verified in response to rebooting the client computing device.

34. The method of claim 31, wherein the method further comprises automatically selecting a new network path to the target data storage device for verification in response to a failed attempt to connect to a previous network path.

* * * * *